May 26, 1953        A. L. ARENBERG        2,640,149
VEHICLE LIGHT CONTROLLING LENS PANEL
Filed June 9, 1948        2 Sheets-Sheet 1
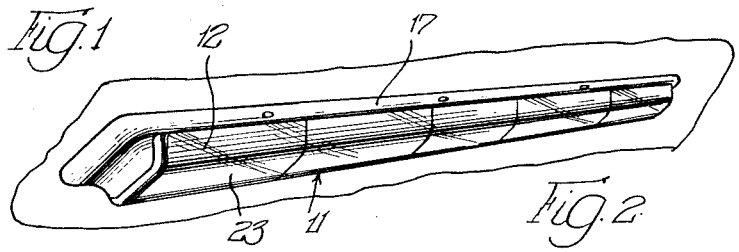
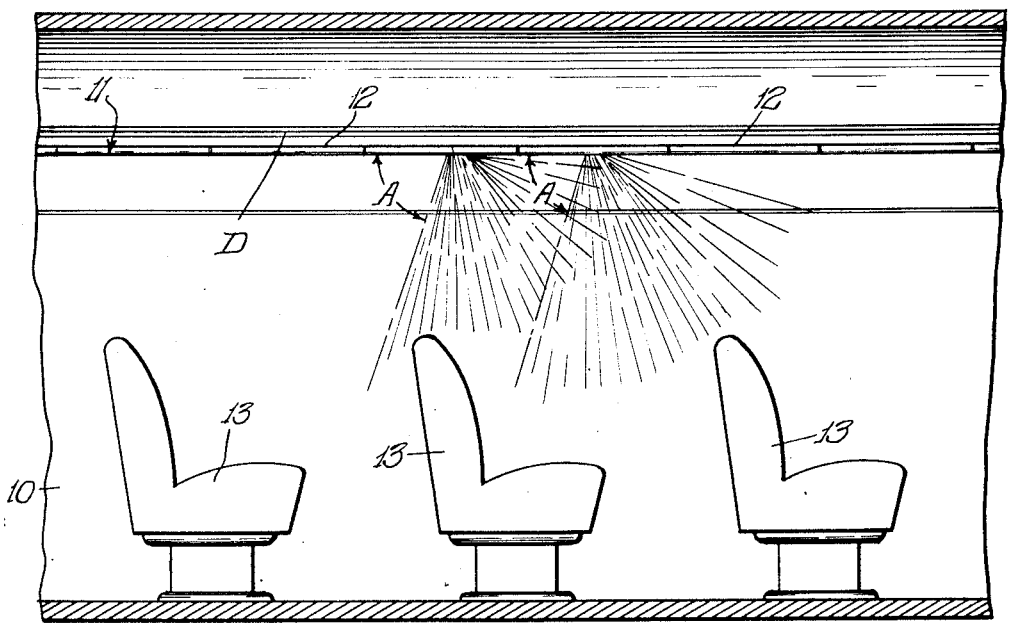
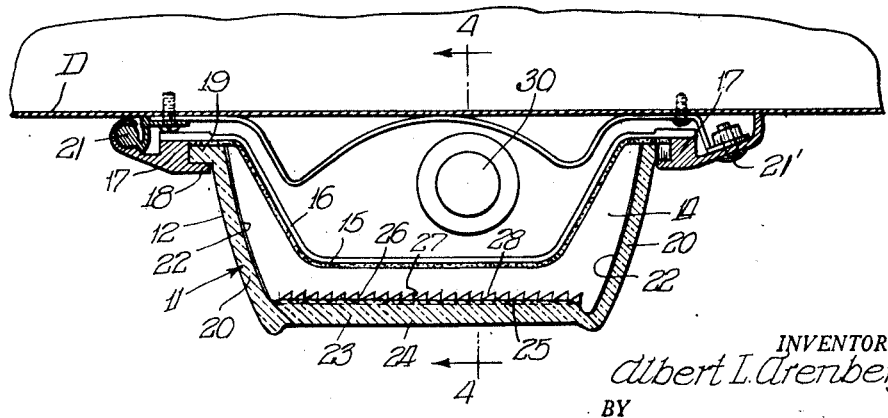
INVENTOR.
Albert L. Arenberg,
BY
Cromwell, Greist & Warden

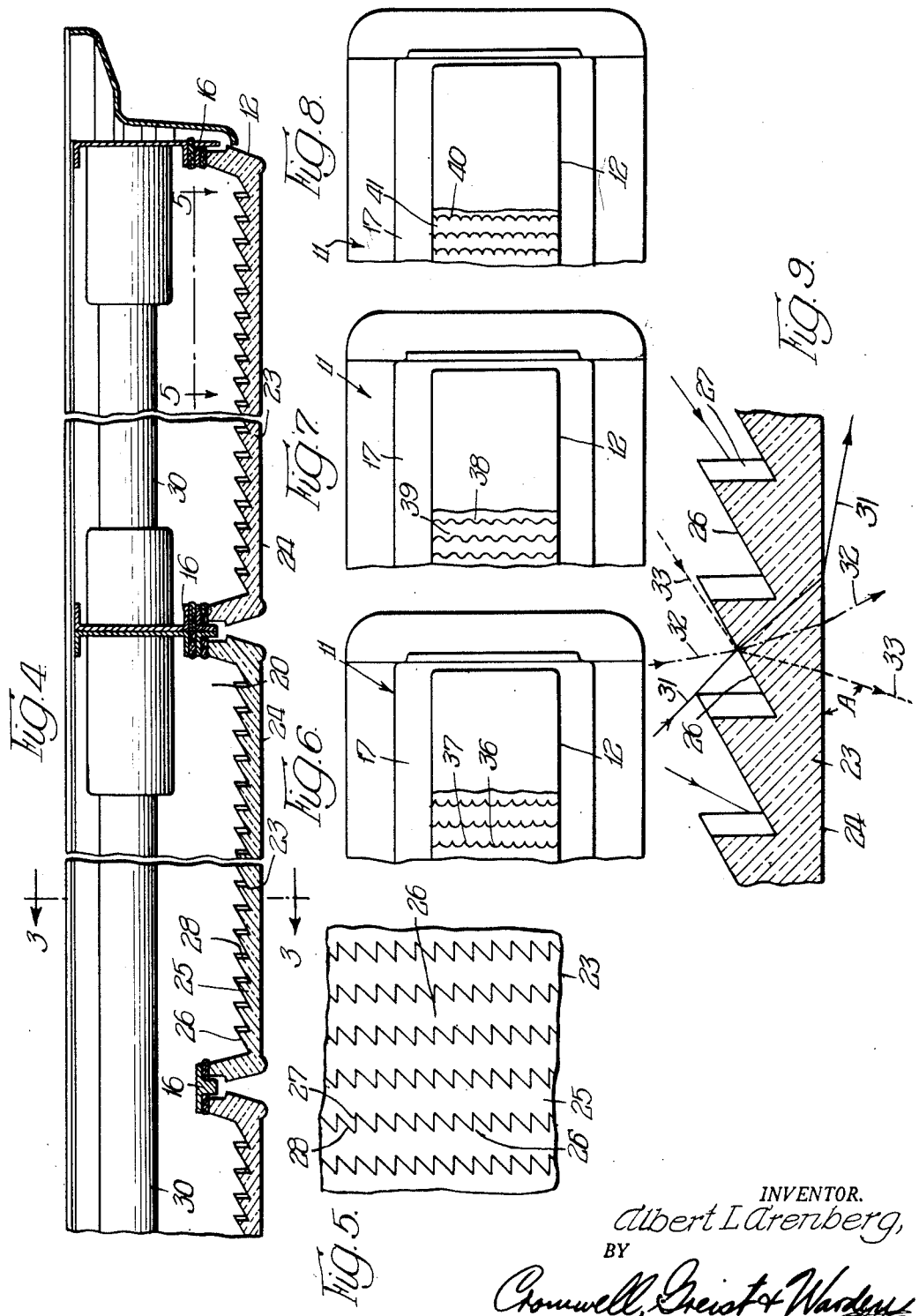

Patented May 26, 1953

2,640,149

UNITED STATES PATENT OFFICE 2,640,149

VEHICLE LIGHT CONTROLLING LENS PANEL

Albert L. Arenberg, Highland Park, Ill., assignor to Patent License Corporation, Chicago, Ill., a corporation of Illinois Application June 9, 1948, Serial No. 31,991

2 Claims. (Cl. 240—106)

The present invention pertains to improvements in a light control system, particularly devised for buses and other passenger vehicles, although it will be apparent that it is likewise well adapted for other, non-vehicular applications.

It is an object of the invention to provide a light control system including an improved light transmissive fixture which functions to effect a thorough flood-lighted illumination of an interior, including the emission of direct reading beams cast in a given direction, while affording protection to occupants against objectionable glare from the opposite direction, this protection being represented by a non-glare, protection angle of substantial size in which direct beams from a source of illumination within said fixture are internally reflected, refracted or blocked, hence are outside the normal line of view of an occupant of said interior.

Another object is to provide a light control system of the foregoing character including an elongated fixture characterized by a plurality of like, transparent panels which are internally lensed in multiple to prevent longitudinal exit of light impinging an inner, upper lens surface through a substantial vertical protection angle in one longitudinal direction, while permitting exit of said light in the opposite direction throughout an angle represented by 180° minus said protection angle, said lenses each presenting a further specially shaped or treated surface at an acute angle to said upper surface which is adapted to largely absorb, internally reflect or deflect the remainder of the light which impinges said lenses.

A still further object is to provide a transparent lensed panel for a lighting fixture of the foregoing character, which panel is adapted to control light emitted from a source in the fashion referred to in the preceding paragraph.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a fragmentary perspective view illustrating the appearance of a fixture in accordance with the present invention as operatively embodied, for example, in a lighting arrangement for a vehicle interior;

Fig. 2 is a fragmentary view in longitudinal vertical section through the center of said interior, showing the relationship of the fixture to the passenger seats of a vehicle and generally illustrating the functioning of the fixture and light control system of which said fixture is a part;

Fig. 3 is an enlarged fragmentary view in transverse vertical section, along a line generally corresponding to line 3—3 of Fig. 4, illustrating certain details of internal lensing of the fixture;

Fig. 4 is a fragmentary view in longitudinal vertical section, along a line generally corresponding to line 4—4 of Fig. 3, further illustrating such details;

Fig. 5 is a fragmentary top plan view, as from line 5—5 of Fig. 4, illustrating the internal appearance of the lensing of the transparent panel of the fixture, in accordance with one embodiment thereof;

Figs. 6, 7 and 8 are, respectively, fragmentary bottom, plan views, partially broken away, and illustrating, in a schematic way, other modified lensing arrangements which are contemplated by the invention for use in substitution for the lens arrangement illustrated in Fig. 5; and Fig. 9 is an enlarged, fragmentary, sectional view illustrating the principles involved in the functioning of the fixture to control lighting, in accordance with the invention.

This invention affords an improved fixture and lens panel thereof which has been particularly devised for the illumination of passenger vehicles such as buses, railway cars, and the like, in which passenger seats are usually arranged in spaced, fixed relation to one another facing in a common direction longitudinally of the vehicle and, generally, on opposite sides of a center aisle. The main problem encountered in the design of practically all overhead lighting arrangements for this purpose has been that of eliminating direct glare impinging the eyes of a passenger within the normal line of sight of the latter. Said glare is represented by the direct viewing of an internal light source or reflector through an area of the fixture which is necessarily made transparent for the purpose of affording a direct, relatively intense reading beam. It is important that such glare be controlled, in the interest of passenger comfort, yet that the fixture at the same time continue to afford adequate direct, downward illumination for reading purposes. It is also important that sufficient diffused lateral illumination be furnished to insure a bright, attractive condition within the interior as a whole.

The present invention accomplishes these purposes by controlling the vertical, rear-to-front angle of emission of direct light through a transparent, lensed panel. This is done by providing for a substantial, obtuse, light exit angle forwardly of any given point of emission, and by preventing vertical exit throughout a substantial protection angle rearwardly of that point, to the end that a direct view of the internal light source of the fixture is not had unless the observer or passenger directs his eyes upwardly along a line of sight paralleling or greater than said protection angle. Notwithstanding this, the normal reading zone of said passenger is flooded with intense direct light from his rear, without any annoyance whatsoever to him or any other occupant of the interior. In accomplishing the foregoing objects, a portion of the total light which internally impinges the lensing is refractively controlled in a vertical plane or direction by one surface thereof while the remainder of said light is similarly controlled in a lateral direction by other surfaces thereof, said last named surfaces acting in conjunction with a diffusive side wall of the lighting panel to complete the lateral light control.

Although in the following description reference is made solely to the adaptation of the fixture to vehicle lighting purposes, it will become evident that the system and fixture are also applicable in many other non-vehicular or structural arrangements in which a non-diffusive, lensed control of illumination through a transparent panel is desired.

Referring to Figs. 1 and 2 of the drawings, the reference numeral 10 designates the interior of a vehicle, such as a passenger bus, railway car or the like, in which the fixture of the invention, generally designated 11, is installed. This fixture is of extremely elongated character, as illustrated in Fig. 1, being made up of a plurality of similar hollow, trough-like, light transmissive panels or sections 12 arranged in end-to-end abutment. Such panels are usually disposed along and over the row of longitudinally spaced seats 13 on either side of the central aisle of the vehicle. The installation may be made in any appropriate manner, i. e., on the ceiling, deck, luggage rack or other appropriate support of the vehicle. Specific details of the herein disclosed mounting provisions for the panels 12 form no part of the invention, and the various structural features thereof, other than the special lensing features, may be considerably modified without involving a departure from the invention; however, I have shown in Figs. 3 and 4 a desirable and practical assembly for this purpose.

As illustrated in those figures, the panels 12 are provided with like shaped, vertically depressed end walls 14 over which felt or sponge rubber sealing strips 15 are disposed and held in place by transverse metal clamping straps 16. These straps overlie the adjacent end walls 14 of successive panels 12. They are appropriately secured at their opposite ends to the elongated, extruded metal frame members 17, said members having inner ledges 18 which support the longitudinal flanges 19 extending along the top of the side walls 20 of the hollow panel. Said straps thus clamp the panels 12 to the aforesaid frame member ledges. Frame members 17 may be further braced and held together by provisions, other than the straps 16, which are not germane to the invention. The resultant frame is pivoted to the supporting surface in the vehicle, represented by the ceiling or deck D by an extruded metal hinge 21. Securing screws 21' spaced along the opposite side of the frame serve to removably hold the parts in the operative position illustrated in Figs. 3 and 4.

The panel 12 is fabricated of a suitable moldable transparent material, for example, glass or one of the well known plastics, such as methyl methacrylate, and its side walls 20 may be rendered light-diffusive in character on their inner surface by enameling, etching or otherwise, as indicated by the reference numeral 22. The remainder of the panel, including particularly the lensed bottom member 23 thereof, is entirely transparent.

Referring to Figs. 3, 4 and 5, the lensed panel 23 is characterized by a smooth, flat, lower or outer surface 24, and the interior thereof is shaped to provide a multiplicity of prisms 25. The present invention primarily resides in the configuration and arrangement of the surfaces of these prisms.

Prisms 25 have the general form of a plurality of successive, parallel internal lands or surfaces 26 of narrow width which are disposed at an angle of about 30° to the horizontal, although this value may vary somewhat. Lens surfaces 26 are arranged in succession in the direction longitudinally of the panel 11 and extend parallel to one another in the direction transversely of the transparent panel member 23, all the way across the latter. The forward edge of inclined surfaces 26 is of a sawtooth shape (see Fig. 5). It is defined by the successive pairs of intersecting planes or edges 27, 28, of which the former parallels the length of the panel and the latter is at a substantial angle thereto, preferably 45°. These edges, and the sawtooth forward lens surface which they define, are disposed vertically, i. e., at an acute angle to the inclined upper lens surfaces 26.

In the functioning of the fixture, light rays from the usual light source, represented in Figs. 3 and 4 by the elongated fluorescent tubes 30, will of course impinge the lenses 25 from many angles; and in Fig. 9 an attempt has been made to illustrate this fact. Considering first of all a light ray whose direction is represented by the solid direction line 31 in Fig. 9, it impinges the surface 26 at a substantial forward and downward angle and is refracted in traversing the transparent panel member 23, exiting therefrom at an extremely small angle to the lower surface 24 of the panel. This ray thus constitutes a component of a beam of intense, direct light issuing downwardly and in the forward direction for reading purposes. The direction of another ray is indicated by the dot-dash line 32 in Fig. 9, indicating a different degree of refraction, and issuance from the panel at a greater degree to its lower surface 24, but still directed forwardly over the shoulders of passengers thereunder. The direction of a third and critical ray is indicated by the dotted line 33 in Fig. 9, being practically coincident with the plane of lens surface 26, or at an infinitesimally greater angle to the horizontal than said surface. This ray is refracted by the lensing and exits from panel member 23 at an angle A which represents the protection angle of the fixture. Other rays projected from the light at a lesser angle to the horizontal than ray 33 will impinge the vertical sawtooth surfaces 27 and 28 and will be refracted laterally by the 45° surfaces 28 of the last named formation, thereby accomplishing a side control of the direct light which is generally similar to the vertical control effected by surfaces 26. In short, the arrangement is such that substantially no components of the light from the source 30 which impinge lens surface 26 will exit from surface 24 at less than the protection angle A; and components striking the sawtooth surface are bent sidewise. Hence, in effect, said source may not be viewed directly through any given point on transparent panel member 23, unless the viewer directs his gaze toward said point at an angle steeper than angle A. The normal line of view is at a far more horizontal angle.

Having reference to diagrammatic Fig. 2, it is seen that occupants of the seats 13 will only be subject to glare in the event that they raise their line of sight parallel to or above the angle represented by protection angle A. Forwardly of this angle the space beneath the fixture 11 is flooded thoroughly from the rear with a relatively intense reading light. Lateral control of light refracted by the sawtooth formations 27, 28 is completed by the translucent side walls 20 of the respective panels 12; and the light source 30 is in such vertical relation to said side walls that rays directly impinging the latter are emitted only in a soft, diffused form.

Figs. 6, 7 and 8 illustrate modified adaptations of the invention, which, in large measure, accomplish similar purposes. In Fig. 6 a generally sawtooth refracting edge 36 for the internal stepped lensing 37 is produced by a forwardly concave scalloping of the vertical lens surface. In Fig. 7 a wavy or undulatory surface 38 is employed on the vertical edge of the parallel stepped lenses 39. In Fig. 8 a forwardly convex scalloping of surface 40 of the lenses 41 is employed, i. e., the reverse of the embodiment of Fig. 6. In all of these adaptations the angularity of the respective lens surfaces 36, 38, 40 and several types of shaped vertical edges 37, 39, 41 is the same as in the first embodiment, and the functioning is generally as described in connection with Fig. 9. Said front, vertical edges, whether defined by intersecting vertical planes constituting a sawtooth outline, by a series of connected concave formations facing in one direction or another with respect to the length of the panel, or in the form of an undulatory line, function to laterally refract the rays which impinge their surface, indicated by the unnumbered direction lines in Fig. 9. They do not exit from the transparent lens section in any appreciable intensity, in so far as projection in the downward and rearward direction, within protection angle A, is concerned. Those skilled in the art will appreciate the possibility of making various alterations in the light transmitting panel and the transparent lensed section thereof, without departing from the principles of the present invention. I therefore desire that such modifications be construed within the scope of the present invention, as defined by the appended claims.

I claim:

1. In a light control fixture, a light transmissive panel of a dished cross sectional outline adapted to be mounted on one side of a light source with opposed wall portions thereof in enclosing relation to the light source, said panel being provided with a substantially flat lens-bearing section extending between said wall portions which is made up of a multiplicity of parallel, longitudinally arranged and transversely extending transparent lens elements of small width compared to their transversely extending length, said lens elements each including a continuous, substantially flat upper surface exposed to said source and disposed at a substantially acute angle to the plane of said lens-bearing section, corresponding longitudinally spaced margins of said surfaces being defined by laterally indented lens surfaces facing in a common direction toward said light source, said indented surfaces extending substantially normal to the plane of said section and at an acute angle to the upper surface of said respective lens elements, said indented surfaces being constituted in part by surface elements in non-parallel relation to the length of said lens element, said lens bearing section being smooth on the side thereof opposite said lens elements.

2. In a light control fixture, an elongated light transmissive panel adapted to be mounted on one side of a light source and having on the side thereof adjacent said source a multiplicity of parallel, longitudinally arranged and transversely extending, transparent lens elements of small width, said lens elements each including a continuous, substantially flat surface exposed to said source and disposed at a substantial acute angle to the plane of the panel, corresponding laterally spaced margins of said surfaces being defined by transparent lens surfaces extending normal to the plane of said panel and at an acute angle to said first named flat surface, said last named lens surface being shaped to provide connected lens elements which are convexly rounded in the direction of said source, said panel being smooth on the surface thereof opposite said lens elements.

ALBERT L. ARENBERG.

References Cited in the file of this patent

UNITED STATES PATENTS

| Number | Name | Date |
|---|---|---|
| 595,273 | Soper | Dec. 7, 1897 |
| 596,882 | Jacobs | Jan. 4, 1898 |
| 720,138 | Hartung | Feb. 10, 1903 |
| 755,196 | Wadsworth | Mar. 22, 1904 |
| 2,133,664 | Lebby | Oct. 18, 1938 |
| 2,232,276 | Schepnoes | Feb. 18, 1941 |
| 2,352,804 | Schepnoes | July 4, 1944 |
| 2,372,874 | Zimmerman | Apr. 3, 1945 |
| 2,434,049 | Nordquist | Jan. 6, 1948 |

FOREIGN PATENTS

| Number | Country | Date |
|---|---|---|
| 574,303 | Great Britain | Dec. 31, 1945 |